No. 772,857. Patented October 18, 1904.

UNITED STATES PATENT OFFICE.

LUDWIG WOLMAN, OF ELBERFELD, GERMANY, ASSIGNOR TO FARBEN-FABRIKEN OF ELBERFELD CO., OF NEW YORK, N. Y., A CORPORATION OF NEW YORK.

TRIOXYANTHRAQUINONE DYE.

SPECIFICATION forming part of Letters Patent No. 772,857, dated October 18, 1904.

Application filed August 18, 1904. Serial No. 221,291. (No Specimens.)

*To all whom it may concern:*

Be it known that I, LUDWIG WOLMAN, doctor of philosophy, chemist, (assignor to the FARBENFABRIKEN OF ELBERFELD COMPANY, of New York,) residing at Elberfeld, Germany, have invented a new and useful Improvement in New Anthracene Dye; and I hereby declare the following to be a clear and exact description of my invention.

My invention relates to the manufacture of the hitherto-unknown 1.2.5-trioxyanthraquinone having the formula

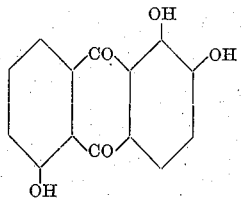

which according to my researches can be obtained by the action of fuming sulfuric acid or sulfuric acid anhydrid and boric acid upon alizarin. The process is to be stopped when the formation of the above-mentioned trioxyanthraquinone is terminated and before a further oxidation takes place. At first a sulfuric-acid ester is produced, which can be transformed into the 1.2.5-trioxyanthraquinone by saponification.

In order to carry out my invention practically, I can proceed as follows, the parts being by weight: In an iron vessel provided with a stirrer twelve parts of boric acid (previously dried at 100° centigrade) are dissolved in one thousand parts of fuming sulfuric acid, (eighty per cent. of $SO_3$,) and eighty parts of dry alizarin are then introduced into the resulting solution at a temperature of about from 30° to 35° centigrade. The mixture is stirred at this temperature for from eighteen to thirty-six hours until a test portion when saponified and then dissolved in sulfuric acid shows a reddish-violet color. Subsequently the reaction mass is diluted by the addition of one thousand parts of sulfuric acid of 60° Baumé, and the resulting mixture is poured into water. The reddish-brown precipitate thus obtained is filtered off and dissolved in hot diluted caustic-soda lye. This solution is then decomposed by the addition of dilute hydrochloric acid on heating the mass for some time to boiling, and the precipitate thus obtained is then filtered off and washed. A yellowish-orange paste is thus obtained, representing a yellowish-orange powder after being dried. By a recrystallization from glacial acetic acid the new body is obtained in the shape of red needles, melting at from 273° to 274° centigrade. By treatment with acetic anhydrid it is transformed into the triacetylized derivative, producing yellow needles having a melting-point of 227° to 228° centigrade. The new 1.2.5-trioxyanthraquinone thus produced is soluble in concentrated sulfuric acid with a reddish-violet color turning blue by the addition of boric acid and soluble in caustic-soda lye with a reddish-violet color, being not essentially changed by the further addition of caustic-soda lye. It dissolves in an alcoholic solution of sodium hydroxid with a blue color, this solution showing a characteristic spectrum, (three bands in orange, yellow, and green.) It dyes alumina-mordanted cotton pure bluish-red and chrome-mordanted cotton bluish-violet shades.

Having now described my invention and in what manner the same is to be performed, what I claim as new, and desire to secure by Letters Patent, is—

The herein-described new 1.2.5-trioxyanthraquinone which represents red needles melting at from 273° to 274° centigrade after a recrystallization from glacial acetic acid; being transformed into the triacetylized derivative producing yellow needles having a melting-point of 227° to 228° centigrade; being soluble in concentrated sulfuric acid with a reddish-violet color turning blue by the addition of boric acid; being dissolved in an alcoholic solution of caustic-soda lye with a blue color, this solution showing a characteristic spectrum having three bands in orange, yellow and green; and dyeing alumina-mordanted cotton pure bluish-red and chrome-mordanted cotton bluish-violet shades, substantially as hereinbefore described.

In testimony whereof I have signed my name in the presence of two subscribing witnesses.

LUDWIG WOLMAN.

Witnesses:
 OTTO KÖNIG,
 J. A. RITTERSHAUS.